(12) United States Patent
Stivoric et al.

(10) Patent No.: US 11,706,111 B1
(45) Date of Patent: Jul. 18, 2023

(54) ANTI-FRAGILE NETWORK

(71) Applicant: X Development LLC, Mountain View, CA (US)

(72) Inventors: John Michael Stivoric, Pittsburgh, PA (US); David Andre, San Francisco, CA (US); Ryan Butterfoss, San Francisco, CA (US); Rebecca Radkoff, San Francisco, CA (US); Salil Vijaykumar Pradhan, San Jose, CA (US); Grace Taixi Brentano, Redwood City, CA (US); Lam Thanh Nguyen, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/732,957

(22) Filed: Apr. 29, 2022

Related U.S. Application Data

(60) Provisional application No. 63/182,443, filed on Apr. 30, 2021.

(51) Int. Cl.
*H04L 43/065* (2022.01)
*H04L 41/0604* (2022.01)
*H04L 41/12* (2022.01)
*H04L 43/0817* (2022.01)

(52) U.S. Cl.
CPC ........ *H04L 43/065* (2013.01); *H04L 41/0627* (2013.01); *H04L 41/12* (2013.01); *H04L 43/0817* (2013.01)

(58) Field of Classification Search
CPC ... H04L 43/065; H04L 41/0627; H04L 41/12; H04L 43/0817
USPC .......................................................... 709/224
See application file for complete search history.

(56) References Cited

U.S. PATENT DOCUMENTS

| | | | |
|---|---|---|---|
| 11,178,014 B1 * | 11/2021 | Sevce | H04L 41/0893 |
| 2007/0192474 A1 * | 8/2007 | Decasper | H04L 67/306 709/223 |
| 2009/0098515 A1 * | 4/2009 | Das | G09B 19/18 434/107 |
| 2017/0063709 A1 * | 3/2017 | Smith | H04L 67/10 |
| 2018/0097694 A1 * | 4/2018 | Raz | H04L 67/10 |
| 2019/0325354 A1 * | 10/2019 | Rajnayak | G06K 9/627 |
| 2020/0084087 A1 * | 3/2020 | Sharma | H04W 24/04 |

(Continued)

*Primary Examiner* — Meng Vang
(74) *Attorney, Agent, or Firm* — Fish & Richardson P.C.

(57) ABSTRACT

Implementations are directed to improving network anti-fragility. In some aspects, a method includes receiving parameter data from a network of nodes, the parameter data comprising attributes, policies, and action spaces for each node in the network of nodes; configuring one or more interruptive events on one or more nodes included in the network of nodes; determining a first action of each node in the network of nodes in response to the one or more interruptive events; determining a first performance metric, for each node, that corresponds to the first action, wherein the first performance matric is determined based on at least a first reward value associated with the first action; continuously updating the first action in an iterative process to obtain a final action, wherein a performance metric corresponding to the final action satisfies a performance threshold, and transmitting the final action for each node to the network of nodes.

20 Claims, 4 Drawing Sheets

(56) References Cited

U.S. PATENT DOCUMENTS

2021/0144164 A1\* 5/2021 Mathur ................... H04L 67/10
2021/0218630 A1\* 7/2021 Lu ......................... H04L 41/065

\* cited by examiner

ANTI-FRAGILE NETWORK

CROSS-REFERENCE TO RELATED APPLICATIONS

This application claims the benefit of U.S. Provisional Application No. 63/182,443 filed on Apr. 30, 2021, the contents of which are incorporated by reference herein.

TECHNICAL FIELD

This specification generally relates to computer simulations of complex networks of nodes, such as networks of agents.

BACKGROUND

A simulation is the imitation of the operation of a real-world process or system over time. Simulations require the use of models. The model represents the key characteristics or behaviors of systems or processes, whereas the simulation represents the evolution of the model over time. Simulations can be used in different contexts, such as simulation of technology for performance tuning or optimizing, safety engineering, testing, training, education, and the like. Simulation can be used to show the eventual real effects of alternative conditions and courses of actions. Simulations are executed using one or more computing devices. Simulations can be used when the real system cannot be engaged, because it may not be accessible, or it may be dangerous or unacceptable to engage, or it is being designed but not yet built, or it may simply not exist.

SUMMARY

In one aspect, this document describes a method for improving network anti-fragility. The method includes receiving, at one or more computing devices, parameter data from a network of nodes, the parameter data comprising attributes, policies, and action spaces for each node included in the network of nodes; configuring, by the one or more computing devices, one or more interruptive events on one or more nodes included in the network of nodes; determining, by the one or more computing devices, a first action of each node included in the network of nodes in response to the one or more interruptive events; determining, by the one or more computing devices, a first performance metric, for each node, that corresponds to the first action, wherein the first performance matric is determined based on at least a first reward value associated with the first action; continuously updating, by the one or more computing devices, the first action in an iterative process to obtain a final action, wherein a performance metric corresponding to the final action satisfies a performance threshold, wherein updating the first action in the iterative process comprises: determining a second action for each node based on the first performance metric for each node, and determining a second performance metric, for each node, that corresponds to the second action, wherein the second performance metric is determined based on a second reward value associated with the second action, and wherein the second reward value is larger than the first reward value; and transmitting, by the one or more computing devices, the final action for each node to the network of nodes.

Other embodiments of this aspect include corresponding computer systems, apparatus, computer program products, and computer programs recorded on one or more computer storage devices, each configured to perform the actions of the method. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

The foregoing and other embodiments can each optionally include one or more of the following features, alone or in combination. In some implementations, setting the one or more interruptive events can include determining a probability distribution of the one or more interruptive events.

In some implementations, determining an action for each node in response to the one or more interruptive events can include determining the action that are included in the action spaces of the node and in accordance with the attributes and the policies of the node. In some implementations, determining an action for each node can include determining the action using a simulation process.

In some implementations, a performance metric of each node can include whether the node resolves the one or more interruptive events. In some implementations, whether the node resolves the one or more interruptive events can be determined based on success criteria that include whether a performance threshold is satisfied under a set of predetermined conditions. In some implementations, the set of predetermined conditions can include a set of threshold values for various costs defined in the policies of the node. In some implementations, the performance metric for each node further can include a difference between i) a reward value of the node corresponding to an action in response to the one or more interruptive event and ii) a threshold reward value that indicates an average reward of the node without the one or more interruptive events. In some implementations, the performance metric for each node further can include a response time to the one or more interruptive events.

In some implementations, the method can include determining a performance metric, for the network of nodes, that includes a number of nodes that resolve the one or more interruptive events; or determining the performance metric, for the network of nodes, that include a percentage of nodes that resolve the one or more interruptive events.

In some implementations, the method can include configuring one or more second interruptive events in a curriculum learning process.

Particular implementations of the subject matter described in this disclosure can be implemented so as to realize one or more of the following advantages.

The robustness and anti-fragility of a network may be improved significantly by simulating the network over a set of interruptive events. The simulation results can include performance metrics that indicate the anti-fragility of each node and the anti-fragility of the entire network in responding to the interruptive events. The performance metrics can be fed back to the simulation. Based on the performance metrics, the action for each node can be adjusted in response to the interruptive events. New performance metrics can be obtained based on the new actions. The new performance metrics can be used to further improve the anti-fragility performance of the nodes and the entire network. During this iterative processing cycle, each node can take better actions in a reinforcement learning process. The anti-fragility of the node and the network of nodes can be improved. In some implementation, the technology described herein can also help the nodes of the network make profit from the disorder of the interruptive events.

It is appreciated that methods and systems in accordance with the present disclosure can include any combination of the aspects and features described herein. That is, methods and systems in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

A network that includes a large number of nodes can be fragile and vulnerable to interruptive events. Due to the interconnection and interdependency of different nodes within the network, an interruptive event that happened on one node may affect many other nodes within the network and/or even the entire network. It is important to improve the anti-fragility of each node and the entire network. The technology described herein can execute simulations on the network of nodes to significantly improve the network anti-fragility. Specifically, an iterative process can be performed to simulate the network over one or more interruptive events. In each iteration, an action is determined in responding to the interruptive events. A performance metric corresponding to the action can be determined. The performance metrics can be fed back to the simulation. Based on the performance metrics, the action for each node can be further adjusted to improve the anti-fragility performance of the nodes and the entire network. During this iterative processing cycle, each node can take better actions in a reinforcement learning process. Furthermore, the technology described herein can help the nodes of the network make profit from the disorder of the interruptive events.

Figure 1:
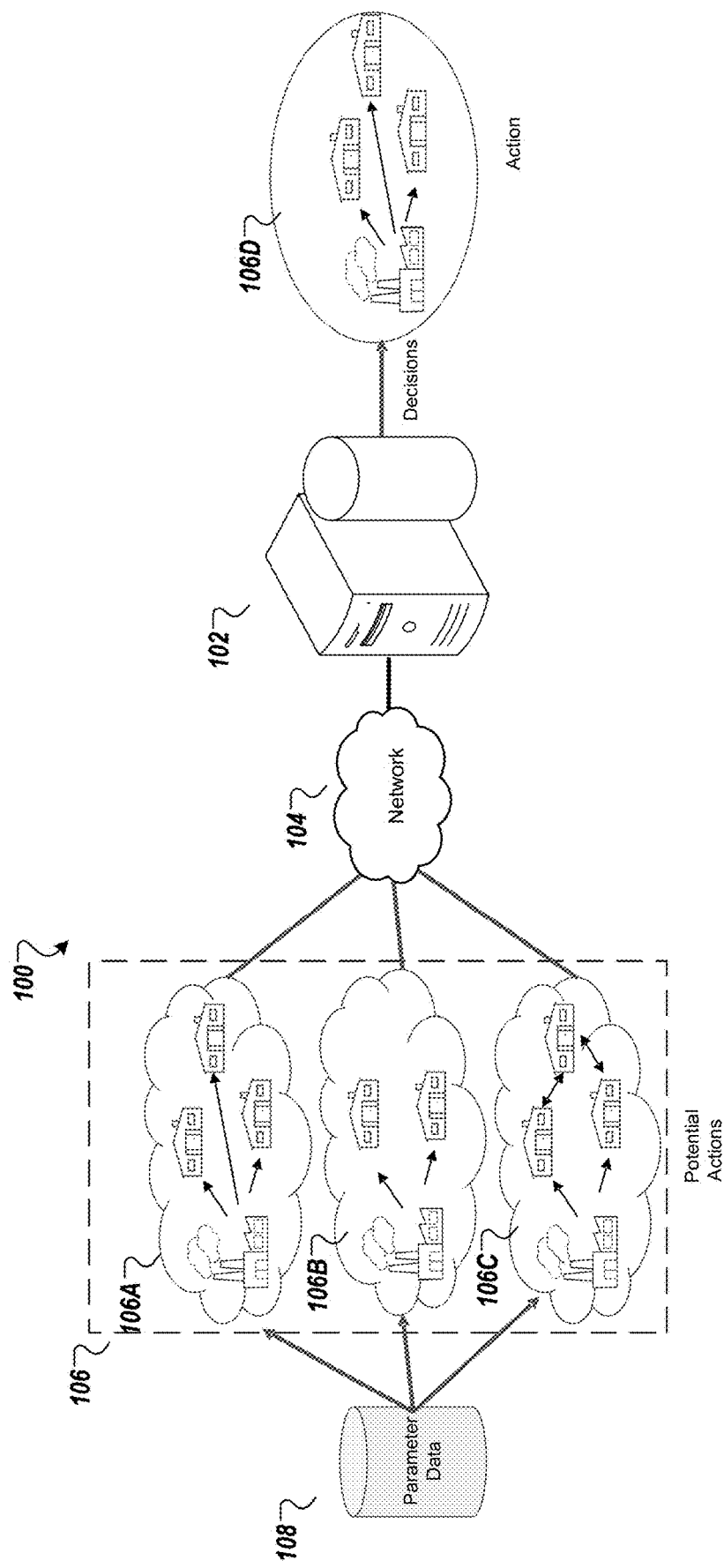
FIG. 1 is a block diagram of an example environment for improving network anti-fragility.

FIG. 1 is a block diagram of an example environment 100 for improving network anti-fragility in accordance with technology described herein. The example environment 100 includes a computing system 102 including one or more computing devices, a communication network 104, and a network of nodes 106. The communication network 104 can include a local area network ("LAN"), wide area network ("WAN"), the Internet, or a combination thereof.

The network of nodes 106 can include a plurality of nodes, with each node representing an entity or agent. Each node can include a computing device that is capable of communicating with the computing system 102 over the communication network 104. The network of nodes 106 can have multiple configurations 160A, 160B, 160C depending on the node interconnection and interdependency. The network of nodes 106 can be any kind of networks for any use cases. For example, the network of nodes 106 can be a network for resource distribution, or a network for power transmission, or a network of supply chain, or a network of cellular molecules.

The nodes included in the network of nodes 106 can be connected with each other. The nodes can be located in the same or different locations. The interconnection and interdependency among the nodes can be flexible and dynamic, which can result in different network configurations 106A, 106B, and 106C. For example, in one configuration, Node A can be connected with Node B. In another configuration, Node A can be disconnected with Node B, and connected with node C.

One or more nodes included in the network of nodes 106 may suffer from interruptive events. The interruptive events can be any events that cause an anomaly or changes on the nodes. For example, the interruptive events can be climate change, pandemics, geopolitical events, or any other Black Swan events. The interruptive events may prevent the one or more nodes from performing their normal actions. Due to the interconnection and interdependency, the anomaly or changes on the one or more nodes can affect other nodes in the network of nodes 106, or the entire network of nodes 106.

Each node in the network of nodes 106 can have its own parameter data 108 including attributes, local policies and action spaces, based on the role of the node. For example, the network of nodes 106 may be a supply chain network. A node in the supply chain network can be a supplier. The attributes of the supplier can include the geolocation, the operation hours, the size, the production capacity, the service or products provided by the supplier, the dependency and connection with other nodes, and the like.

The local policies of the supplier can include goals, needs or wishes tailored to the specific supplier. For example, the policies for the supplier can include the priorities of different costs. For example, a supplier may care about the carbon cost more than the shipping cost. The policies can include the success criteria in response to different interruptive events. The success criteria can include whether a performance threshold is satisfies under a set of predetermined conditions. The set of predetermined conditions can include a set of threshold values for various costs. For example, a supplier may determine that, if 75% of the demand is satisfied during a pandemic with shipping cost less than a threshold A and carbon cost less than a threshold B, the supplier has successfully solved the disruption caused by the pandemic.

The action spaces of a node in the network of nodes 106 can include the potential actions the node can take. For example, a supplier in the supplier chain network may open a new production line to increase production capability, or switch to green resources to reduce carbon cost, or change the timing of transportation to reduce shipping cost. In some examples, the potential actions can include changing the dependency or connection to one or more other nodes in the network of nodes 106. For example, the supplier may decide to buy raw materials from a different vendor, or switch to a different transportation company. The action spaces of each node can be based on the role of the node and any other attributes of the node.

The computing system 102 can receive the parameter data 108 of each node from the network of nodes 106 through the communication network 104. The computing system 102 can simulate actions of the network of nodes 106 over interruptive events to improve the anti-fragility of the network of nodes 106. In some implementations, the computing system 102 can configure one or more interruptive events on one or more nodes of the network of nodes 106. In some examples, the computing system can determine a probability distribution of the one or more interruptive events. In some examples, the computing system can set a specific probability, e.g., 5%, for a particular interruptive event. The computing system 102 can perform simulation on the network of node 106 in response to the one or more interruptive events. The simulation results can indicate the performance of each node and the performance of the entire network in responding to the interruptive events.

In some implementations, each node from the network of nodes 106 can record its parameter data in its own local storage device. These parameter data of a node may be stored locally on a computer in a non-standard format select by whichever hardware or software platform of the node. The computing system 102 can receive the parameter data from each node, convert and consolidate the parameter data from different nodes into a standardized format. The computing system 102 can store the standardized parameter data into a storage device, such as a local storage device or a network-based storage device. The computing system 102 can perform simulation on the network of nodes 106 based on processing the parameter data from different nodes in the standardized format. The simulation based on the standardized parameter data can be more efficient and accurate.

In some implementations, the computing system 102 can provide a graphical user interface (GUI) for reviewing and updating the parameter data in real time. For example, each node is given remote access through the GUI to view or update its parameter data, using a user device, e.g., a personal computer, a handheld device, etc. When a node wants to update its parameter data, a user associated with the node can input the update in any format used by the user device. The computing system 102 can convert the update into the standardized format and store the update into the storage device of the computing system 102.

The computing system 102 can perform the simulation on the network of nodes 106 in an iterative process. In each iteration, the computing system 102 can determine the action for each node included in the network of nodes 106 in response to the one or more interruptive events. The determined action for each node can be included in the action spaces of the respective node. The determined action for each node can be in accordance with the attributes and policies of the respective node. The computing system 102 can determine a reward value for each node corresponding to the action.

In some implementations, each node can make their own decision on the actions to take in response to the interruptive events and determine the reward value corresponding to the actions. In some implementations, the computing system 102 can determine the actions to take for each node based on the node's parameter data including attributes, policies, and action spaces, and determine the reward values, for each node, that correspond to the actions.

The computing system 102 can further determine a performance metric for each node (also referred to as node performance metric), and a performance metric for the entire network of nodes 106 (also referred to as network performance metric). The node performance metric can be based on the reward value of each node. In some examples, the performance metric can indicate whether a node can successfully resolve the one or more interruptive events. In some examples, the performance metric can include a profit value for a node. In some examples, the performance metric can include a response time of a node to the one or more interruptive events. The computing system 102 can determine the network performance metric based on the node performance metric. The performance metrics can indicate the antifragility performance of each node and the antifragility performance of the entire network in reacting to the interruptive events.

The computing system 102 can perform an iterative process to continuously improve the performance metrics until the performance metrics satisfy a performance threshold. For example, the computing system 102 can feedback the performance metrics back to the simulation. Based on the performance metrics, the computing system 102 can adjust the actions for each node in response to the interruptive events. The computing system 102 can obtain new performance metrics based on the new actions. During this iterative processing cycle, each node can take better actions in a reinforcement learning process. The anti-fragility of the node and the network of nodes 106 can be improved. In some implementation, the technology described herein can also help the nodes of the network make profit from the disorder of interruptive events.

The computing system 102 can determine a final configuration 106D for the network of nodes, whose performance metrics satisfy the performance threshold. The final configuration 106D can include a final action for each node included in the network of nodes 106. The computing system 102 can transmit the final configuration including the final action of each node to the network of nodes 106 over the communication network 104. So that the network of nodes can take proper actions accordingly in responding to the one or more interruptive events.

The computing system 102 can include one or more computing devices, such as a server. The various functional components of the computing system 102 may be installed on one or more computers as separate functional components or as different modules of a same functional component. For example, the various components of the computing system 102 can be implemented as computer programs installed on one or more computers in one or more locations that are coupled to each through a network. In cloud-based systems for example, these components can be implemented by individual computing nodes of a distributed computing system.

Figure 2:
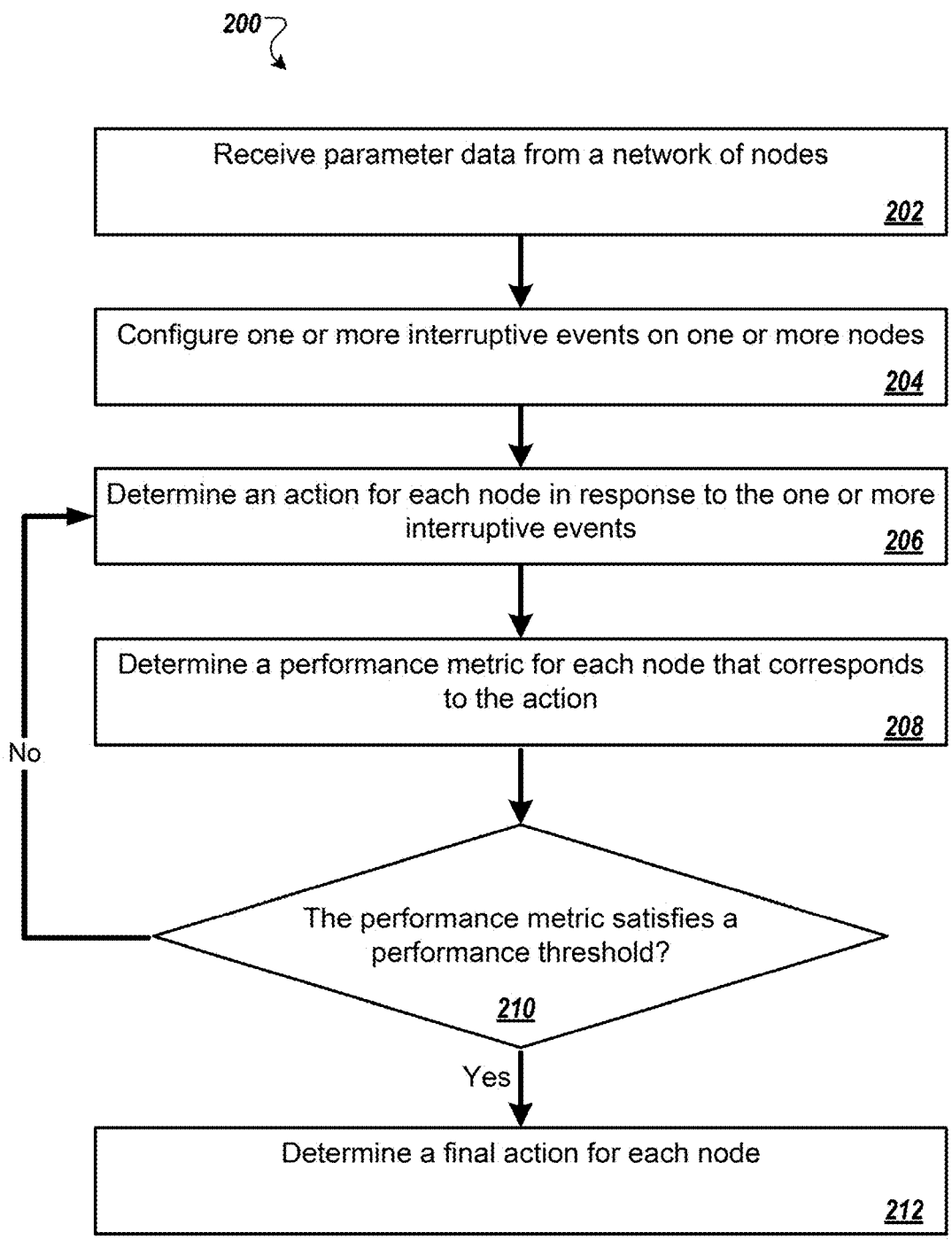
FIG. 2 is a flow diagram of an example process for improving network anti-fragility.

FIG. 2 is a flow diagram of an example process 200 for improving network anti-fragility. In some implementations, at least a portion of the process 200 can be executed at the computing system 102.

At step 202, the computing system can receive parameter data from a network of nodes. The parameter data can include attributes, policies, and action spaces for each node included in the network of nodes. As discussed above, the attributes, policies, and action spaces can be specific to a node.

The policies can include goals, needs or wishes tailored to a respective node. The policies can include the success criteria in response to different interruptive events. The success criteria can include whether a performance threshold is satisfied under a set of predetermined conditions. The set of predetermined conditions can include a set of threshold values for various costs. The computing system can use the success criteria to determine whether a node successfully resolves one or more interruptive events.

The action spaces of a node can include the potential actions the node can take. In some examples, the potential actions can include changing the dependency or connection to one or more other nodes in the network of nodes.

At step 204, the computing system can configure one or more interruptive events on one or more nodes included in the network of nodes. The interruptive events can be any events that may prevent the one or more nodes from performing their normal actions. Due to the interconnection and interdependency, the anomaly or changes on the one or more nodes can affect other nodes or the entire network of nodes. In some examples, the computing system can determine a probability distribution of the one or more interruptive events. In some examples, the computing system can set a specific probability, e.g., 5%, for a particular interruptive event.

At step 206, the computing system can determine an action of each node included in the network of nodes in response to the one or more interruptive events. The computing system can perform simulation on the network of nodes in response to the one or more interruptive events. The determined action for each node can be included in the action spaces of the respective node. The determined action for each node can be in accordance with the attributes and the policies of the respective node.

At step 208, the computing system can determine a performance metric, for each node, that corresponds to the action. The performance metric is determined based on at least a reward value associated with the action.

The computing system can determine the reward value for each node corresponding to the action. In some implementations, the reward value is determined based on at least one or more costs associated with the action. In some examples, the reward value can be negatively correlated with the at least one or more costs. For example, in a supply chain network, the computing system can determine the reward value for a node based on shortage cost for not meeting demand, cost of shipping goods, cost of storing goods, carbon cost, and any other cost. In some implementations, the computing system can determine the reward value of each node by considering the policies defined by the node, that includes the priorities of the various costs, the success criteria, and any other policies. In some implementations, the computing system can determine and output the reward value at a predetermined time step, e.g., every 30 minutes.

The computing system can determine a performance metric for each node based on at least the reward value of the node. The performance metric can indicate whether the node successfully resolves the one or more interruptive events. In some implementations, whether a node successfully resolves the one or more interruptive events can be reflected in the reward value of the node. For example, the computing system may determine that the reward value is zero if the node fails to resolves the one or more interruptive events. In some implementations, whether a node successfully resolves the one or more interruptive events are determined based on the success criteria defined in the policies of the node. As discussed above, the success criteria can include whether a performance threshold is satisfied under constraints or a set of predetermined conditions. The set of predetermined conditions can include a set of threshold values for various costs. For example, if a node can satisfy 75% of the demand during a pandemic with shipping cost less than a threshold A and carbon cost less than a threshold B, the node has successfully solved the disruption caused by the pandemic. If the node can successfully resolves the one or more interruptive events, the node has achieved anti-fragility.

In some implementations, the performance metric can include the reward value. The performance metric can also include a reward value difference comparing to a threshold reward value. For example, the computing system can determine a difference between i) the reward value corresponding to the determined action in response to the one or more interruptive event and ii) a threshold reward value that indicates an average reward of the node without the one or more interruptive events. The threshold reward value can be the typical reward value of a node in normal situations. The reward value difference can be a profit value for the node. For example, if the difference is a positive value, the computing system can determine that the node can achieve a larger reward value in responding to the interruptive events comparing to its normal operations, and that the node can profit from the interruptive events. When a node can profit from the interruptive events, the computing system can determine that the node can achieve a high level of anti-fragility. A larger value of this difference is associated with a higher level of success in achieving anti-fragility. The reward value difference can indicate a level of success of the node in responding to the one or more interruptive events.

In some implementations, the performance metric can include a response time to the one or more interruptive events. The response time can be the amount of time for each node to take to successfully resolve the one or more interruptive events. A shorter response time is associated with a higher level of anti-fragility.

The computing system can use the performance metric of each node to measure its anti-fragility. For example, based on the different sub-metrics of the performance metric, e.g., whether the node successfully resolves the one or more interruptive events, the profit or the reward value difference, and a response time to the one or more interruptive events, the computing system can determine an overall measurement of the node's anti-fragility. In some implementations, the computing system can combine the different sub-metrics by assigning a weight value to each of them.

In some implementations, the computing system can determine a performance metric for the entire network of nodes (also referred to as network performance metric). The performance metric for the entire network of nodes can be used to measure the anti-fragility of the entire network of nodes. In some examples, the network performance metric can include the number of nodes that successfully resolve the one or more interruptive events. In some examples, the network performance metric can be the percentage of the nodes that successfully resolve the one or more interruptive events. In some examples, the network performance metric can include an average response time among the nodes included in the network of nodes. In some examples, the network performance metric can include the average reward value. In some example, the network performance metric can include the average profit, e.g. the average reward value difference. The computing device can determine an overall anti-fragility for the entire network of nodes based on the network performance metric. For example, the different sub-metrics included in the network performance metric can be combined based on a respective weight value.

At step 210, the computing system can determine whether the performance metric of the action satisfies a performance threshold. If the performance metric satisfies a performance threshold, the process proceeds to step 212. If the performance metric of the action does not satisfy the performance threshold, the computing system performs an iterative process. For example, the computing system can return to step 206 and update the action of each node based on the performance metric.

The computing system can continuously update the action of each node in an iterative process to obtain a final action. The performance metric corresponding to the final action satisfies the performance threshold. For example, as described above in steps 206 and 208, in a first iteration, the computing system can execute the simulation to determine an action for each node and determine the performance metrics corresponding to the action based on the simulation results. The performance metrics can include the performance metric corresponding to the action for each node, and the performance metric for the entire network of nodes. The performance metrics indicate the anti-fragility of the node or the entire network of nodes.

As discussed above, the computing system can determine the reward value corresponding to the action for each node based on the simulation results. The computing system can determine the performance metrics using the reward value. For example, based on the reward value, the computing system can determine whether the node successfully resolves the one or more interruptive events. The computing system can determine how much profit the node made from the one or more interruptive events. In some implementations, the computing system can determine the performance metric in terms of response time.

The computing system can feed the performance metrics back to the simulation to continuously improve the anti-fragility of node and the entire network of nodes. In a second iteration, e.g., the next iteration, the computing system can execute the simulation to determine an updated action for each node and determine the updated performance metrics corresponding to the updated action based on the new simulation results. The updated performance metrics can indicate the updated anti-fragility of the node or the entire network of nodes. The computing system can determine an updated reward value corresponding to the updated action for each node. The computing system can determine the updated performance metrics using the updated reward value. In some implementations, the computing system can determine the updated performance metrics in terms of response time. In the second iteration, the updated reward value of each node is larger than the reward value in the first iteration. The computing system can continuously update the action in the iterative process until the performance metric corresponding to the updated action satisfies a performance threshold. During the iterative process, the computing system can determine better actions for each node, which can result in a better reward value and a better performance metric. The anti-fragility of the node and the entire network of nodes can be improved.

The iterative process can be a reinforcement learning process that allows the computing system to learn from the different actions and their corresponding performance metrics. So that the computing system can make better decisions on the actions of each node in response to the one or more interruptive events and improve the anti-fragility of the node and the entire network of nodes.

In each iteration, the computing system can compare the performance metric corresponding to the updated action with the performance threshold. As discussed above, the performance metric can be a node performance metric, e.g., for each node; or a network performance metric, e.g., for the entire network. The performance threshold can be a threshold for each node or a threshold for the entire network. In some example, the computing system can determine whether the node performance metric satisfies the performance threshold for each node, or whether the network performance metric satisfies the performance threshold for the network, or both.

At step 212, the computing system can determine the updated action, for each node, whose performance metric satisfies the performance threshold as the final action. The computing system can transmit the final action of each node to the network of nodes. So that the network of nodes can take proper actions accordingly in responding to the one or more interruptive events.

The order of steps in the process 200 described above is illustrative only, and the process 200 can be performed in different orders. In some implementations, the process 200 can include additional steps, fewer steps, or some of the steps can be divided into multiple steps.

In some implementations, the computing system can configure one or more other interruptive events in a curriculum learning process. The computing system can train an artificial intelligent model, e.g., machine learning model, with curriculum learning. Curriculum learning is a training strategy that trains a machine learning model from easier data to harder data, which imitates the meaningful learning order in human curricula. For example, the computing system can start with simple interruptive events and gradually increase the complexity of the interruptive events. The computing system can first configure one or more interruptive events that are simple and with less impacts on the network of nodes. After executing simulations and the reinforcement learning on such simpler interruptive events, the computing system can configure another one or more interruptive events that are more complicated with more impacts on the network of nodes. The computing system can execute simulations and reinforcement learning on the more complicated interruptive events. As a result, the computing system can train a machine learning model that can improve the anti-fragility of the nodes and the entire network of node in response to different types of interruptive events with different complexity levels.

Figure 3:
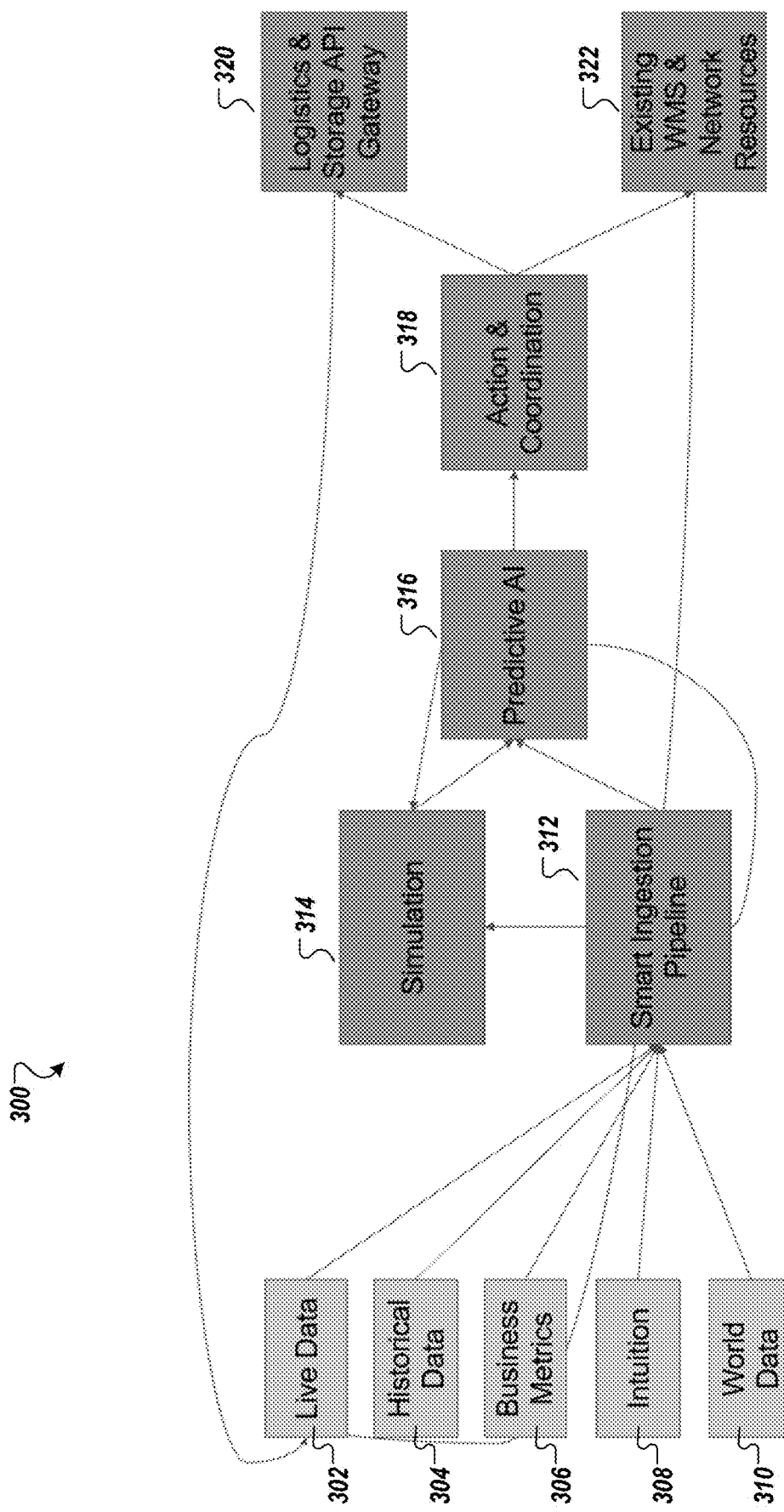
FIG. 3 is a block diagram of an example data flow for improving network anti-fragility.

FIG. 3 is a block diagram of an example data flow 300 for improving network anti-fragility. Live data 302 can come from real-time and bulk data imports from the network of nodes. For example, in a supply chain network, the live data 302 can include inventory levels, inventory locations, transport capacity, transport availability, transport location, and the like. The live data 302 can also include data from various nodes, e.g., partner nodes, on availability of services and costs.

Historical data 304 can be a data warehouse from the network of nodes. In the example of supply chain network, the historical data 304 can include route cost and reliability.

Business data 306 can include sales forecasting, location forecasting, sell through, ad response slick-through rates with location, and the like, in a supply chain network.

Intuition 308 can include user provided goal and other external data. For example, a user may provide the system that "we are doing a large ad buy during the holiday season, and expect major interest in Product A."

World data 310 can include weather, traffic, news, state department threat forecast, and the like.

Smart ingestion pipeline 312 can have data sources flow through it initially to be processed into an acceptable data, e.g., data warehouse, for the simulator. The smart ingestion pipeline 312 can provide machine learning models based on classification and parsing to automatically extract data into the correct format.

Simulation 314 can be performed by a simulator that runs large scale simulations and tests hypothesis over the entire network. The simulation 314 can constantly update with live data changes and account for a large number of potential events on the planning horizon.

Predictive artificial intelligence (AI) 316 can be a reinforcement learning model that examines the existing system state along with simulation results, and determines any course of action that should be taken to meet current goals and target metrics. The predictive AI 316 can use the simulation 314 to test hypothesis.

Action and coordination 318 can take output of the predictive AI 316 and turn the output into pending actions using available application programming interfaces (APIs). The pending actions can be subject to human overview and approval prior to execution.

Logistics gateway API 320 and network resources 322 can include APIs to fulfill the goals of the network.

Figure 4:
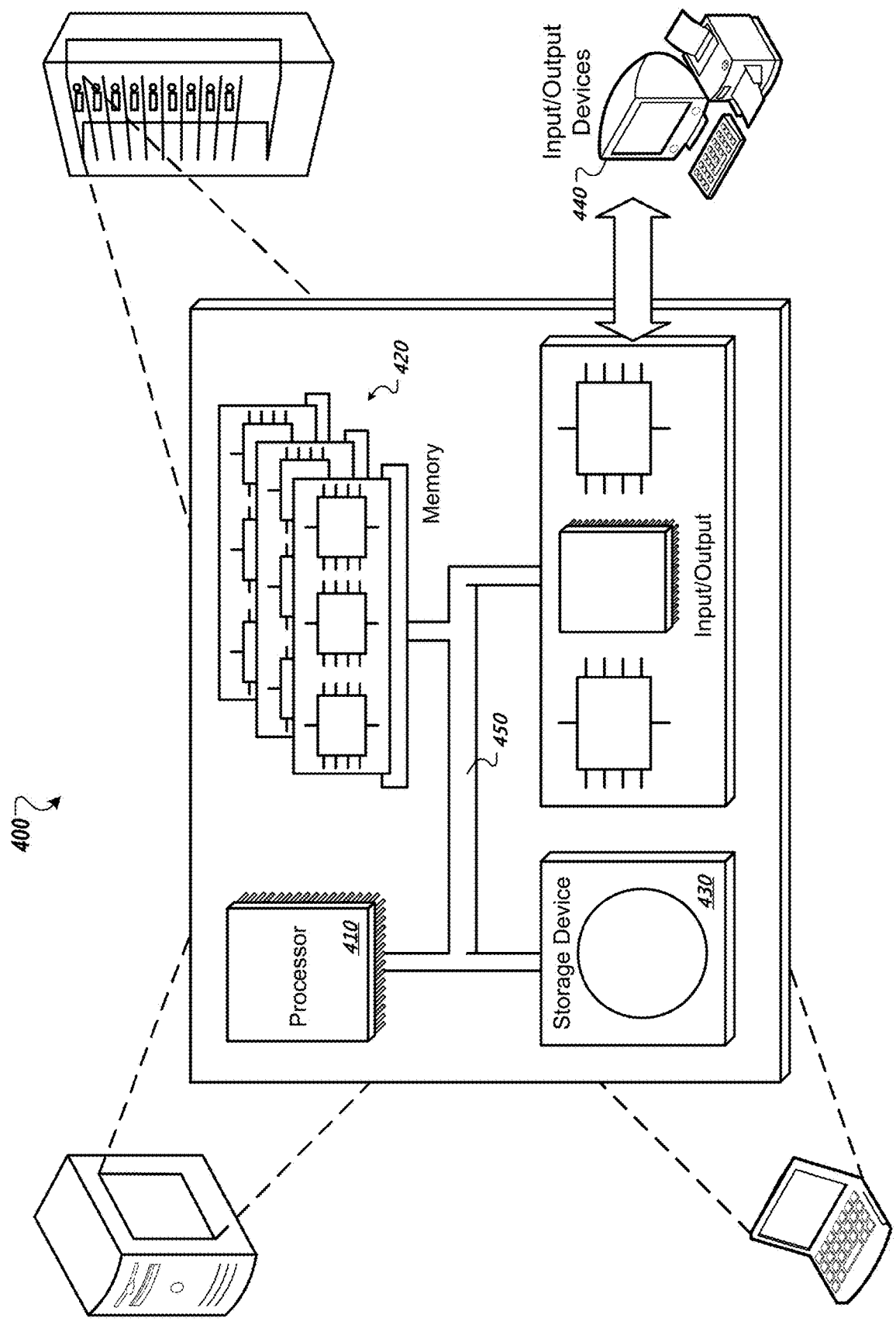
FIG. 4 is a schematic diagram of an exemplary generic computer system.

FIG. 4 illustrates a schematic diagram of an exemplary generic computer system 400. The system described above may be implemented on the system 400.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, a solid state drive, an optical disk device, a tape device, universal serial bus stick, or some other storage device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a rail trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

Although a few implementations have been described in detail above, other modifications may be made without departing from the scope of the inventive concepts described herein, and, accordingly, other implementations are within the scope of the following claims.

The invention claimed is:

1. A computer-implemented method comprising:
receiving, at one or more computing devices, parameter data from a network of nodes, the parameter data comprising attributes, policies, and action spaces for each node included in the network of nodes;
configuring, by the one or more computing devices, one or more interruptive events on one or more nodes included in the network of nodes;
determining, by the one or more computing devices, a first action of each node included in the network of nodes in response to the one or more interruptive events;
determining, by the one or more computing devices, a first performance metric, for each node, that corresponds to the first action, wherein the first performance metric is determined based on at least a first reward value associated with the first action;

performing a reinforcement learning process to train a machine learning model to generate actions to be performed by nodes that improve anti-fragility of the network, including continuously updating, by the one or more computing devices, the first action for each node in the reinforcement learning process until an anti-fragility metric of a final action satisfies a performance threshold representing the anti-fragility of the network, wherein updating the first action for a node in the reinforcement learning process comprises:

determining an updated action for the node based on the first performance metric of the first action, and determining an updated performance metric, for the node, that corresponds to the updated action, wherein the updated performance metric is determined based on an updated reward value associated with the updated action, and wherein the updated reward value is larger than the first reward value; and transmitting, by the one or more computing devices, the final action for each node to the network of nodes, whereby each node performs the final action in response to the one or more interruptive events.

2. The computer-implemented method of claim 1, wherein setting the one or more interruptive events comprises:

determining a probability distribution of the one or more interruptive events.

3. The computer-implemented method of claim 1, wherein determining an action for each node in response to the one or more interruptive events comprises:

determining the action that are included in the action spaces of the node and in accordance with the attributes and the policies of the node.

4. The computer-implemented method of claim 1, wherein determining an action for each node comprises:

determining the action using a simulation process.

5. The computer-implemented method of claim 1, wherein a performance metric of each node comprises whether the node resolves the one or more interruptive events.

6. The computer-implemented method of claim 5, wherein whether the node resolves the one or more interruptive events are determined based on success criteria that include whether a performance threshold is satisfied under a set of predetermined conditions.

7. The computer-implemented method of claim 6, the set of predetermined conditions comprises a set of threshold values for various costs defined in the policies of the node.

8. The computer-implemented method of claim 5, wherein the performance metric for each node further comprises a difference between i) a reward value of the node corresponding to an action in response to the one or more interruptive events and ii) a threshold reward value that indicates an average reward of the node without the one or more interruptive events.

9. The computer-implemented method of claim 5, wherein the performance metric for each node further comprises a response time to the one or more interruptive events.

10. The computer-implemented method of claim 1, comprising:

determining a performance metric, for the network of nodes, that includes a number of nodes that resolve the one or more interruptive events; or determining the performance metric, for the network of nodes, that includes a percentage of nodes that resolve the one or more interruptive events.

11. The computer-implemented method of claim 1, comprising:

configuring one or more second interruptive events in a curriculum learning process.

12. A non-transitory computer-readable medium encoded with instructions that, when executed by one or more computers, cause the one or more computers to perform operations comprising:

receiving parameter data from a network of nodes, the parameter data comprising attributes, policies, and action spaces for each node included in the network of nodes;

configuring one or more interruptive events on one or more nodes included in the network of nodes;

determining a first action of each node included in the network of nodes in response to the one or more interruptive events;

determining a first performance metric, for each node, that corresponds to the first action, wherein the first performance metric is determined based on at least a first reward value associated with the first action;

performing a reinforcement learning process to train a machine learning model to generate actions to be performed by nodes that improve anti-fragility of the network, including continuously updating the first action for each node in the reinforcement learning process until an anti-fragility metric of a final action satisfies a performance threshold representing the anti-fragility of the network, wherein updating the first action for a node in the reinforcement learning process comprises:

determining an updated action for the node based on the first performance metric of the first action, and determining an updated performance metric, for the node, that corresponds to the updated action, wherein the updated performance metric is determined based on an updated reward value associated with the updated action, and wherein the updated reward value is larger than the first reward value; and transmitting the final action for each node to the network of nodes, whereby each node performs the final action in response to the one or more interruptive events.

13. The non-transitory computer-readable medium of claim 12, wherein setting the one or more interruptive events comprises:

determining a probability distribution of the one or more interruptive events.

14. The non-transitory computer-readable medium of claim 12, wherein determining an action for each node in response to the one or more interruptive events comprises:

determining the action that are included in the action spaces of the node and in accordance with the attributes and the policies of the node.

15. The non-transitory computer-readable medium of claim 12, wherein a performance metric of each node comprises whether the node resolves the one or more interruptive events.

16. The non-transitory computer-readable medium of claim 15, wherein whether the node resolves the one or more interruptive events are determined based on success criteria that include whether a performance threshold is satisfied under a set of predetermined conditions.

17. A system comprising one or more computers comprising one or more processors and one or more storage devices on which are stored instructions that are operable, when executed by the one or more computers, to cause the one or more computers to perform operations comprising:

receiving parameter data from a network of nodes, the parameter data comprising attributes, policies, and action spaces for each node included in the network of nodes;

configuring one or more interruptive events on one or more nodes included in the network of nodes;

determining a first action of each node included in the network of nodes in response to the one or more interruptive events;

determining a first performance metric, for each node, that corresponds to the first action, wherein the first performance metric is determined based on at least a first reward value associated with the first action;

performing a reinforcement learning process to train a machine learning model to generate actions to be performed by nodes that improve anti-fragility of the network, including continuously updating the first action for each node in the reinforcement learning process until an anti-fragility metric of a final action satisfies a performance threshold representing the anti-fragility of the network, wherein updating the first action for a node in the reinforcement learning process comprises:

determining an updated action for the node based on the first performance metric of the first action, and determining an updated performance metric, for the node, that corresponds to the updated action, wherein the updated performance metric is determined based on an updated reward value associated with the updated action, and wherein the updated reward value is larger than the first reward value; and transmitting the final action for each node to the network of nodes, whereby each node performs the final action in response to the one or more interruptive events.

18. The system of claim 17, wherein setting the one or more interruptive events comprises:

determining a probability distribution of the one or more interruptive events.

19. The system of claim 17, wherein determining an action for each node in response to the one or more interruptive events comprises:

determining the action that are included in the action spaces of the node and in accordance with the attributes and the policies of the node.

20. The system of claim 17, wherein a performance metric of each node comprises whether the node resolves the one or more interruptive events.

* * * * *